United States Patent
Monti

(10) Patent No.: US 12,202,138 B2
(45) Date of Patent: Jan. 21, 2025

(54) CABLE-DRIVEN ROBOT

(71) Applicant: MARCHESINI GROUP S.p.A., Pianoro (IT)

(72) Inventor: Giuseppe Monti, Pianoro (IT)

(73) Assignee: Marchesini Group S.P.A. (IT)

( * ) Notice: Subject to any disclaimer, the term of this patent is extended or adjusted under 35 U.S.C. 154(b) by 0 days.

(21) Appl. No.: 18/271,139

(22) PCT Filed: Feb. 3, 2022

(86) PCT No.: PCT/IB2022/050951
§ 371 (c)(1),
(2) Date: Jul. 6, 2023

(87) PCT Pub. No.: WO2022/167973
PCT Pub. Date: Aug. 11, 2022

(65) Prior Publication Data
US 2023/0405801 A1    Dec. 21, 2023

(30) Foreign Application Priority Data

Feb. 5, 2021  (IT) ........................ 102021000002558

(51) Int. Cl.
*B25J 9/00* (2006.01)
*B25J 9/10* (2006.01)

(52) U.S. Cl.
CPC ........... *B25J 9/0078* (2013.01); *B25J 9/1045* (2013.01)

(58) Field of Classification Search
CPC ......... B25J 9/0078; B25J 9/104; B25J 9/1045
See application file for complete search history.

(56) References Cited

U.S. PATENT DOCUMENTS

| 5,313,854 A | 5/1994 | Akeel | |
|---|---|---|---|
| 2014/0290417 A1* | 10/2014 | Lukka | B25J 9/0078 |
| | | | 74/490.04 |
| 2014/0331808 A1* | 11/2014 | Reid | B25J 9/0075 |
| | | | 74/490.04 |
| 2017/0174450 A1* | 6/2017 | Zi | B25J 9/0078 |
| 2020/0298395 A1* | 9/2020 | Monti | B25J 9/0078 |

(Continued)

FOREIGN PATENT DOCUMENTS

| DE | 102019122762 A1 | 2/2020 |
|---|---|---|
| FR | 2910833 A1 | 7/2008 |
| WO | WO 2019/241690 A1 | 12/2019 |

*Primary Examiner* — Joseph Brown
(74) *Attorney, Agent, or Firm* — Endurance Law Group PLC

(57) ABSTRACT

A cable-driven robot includes a base structure, a plurality of cables, a movable element suspended by cables, and a system with a plurality of movement units for moving the cables and the movable operating element with respect to the base structure. At least one movement unit has a frame hinged to the base structure for swinging about a hinge axis. A motor mounted on the frame has a rotation shaft and at least one cable winding/unwinding element. The latter includes a drum mounted on the frame and rotatable by the shaft of the motor. The drum has a lateral surface with a helical groove extending coaxially with respect to the axis of the drum and defining a series of hollow turns each conformed to receive and contain internally thereof a corresponding winding turn of the cable during the winding/unwinding of the cable about the drum.

13 Claims, 4 Drawing Sheets

(56) References Cited

U.S. PATENT DOCUMENTS

2021/0069897 A1* 3/2021 Vachon .................. B25J 9/1045
2021/0387351 A1* 12/2021 Wang .................... B25J 9/0078
2021/0402689 A1* 12/2021 Niederberger ........ B29C 64/209

* cited by examiner

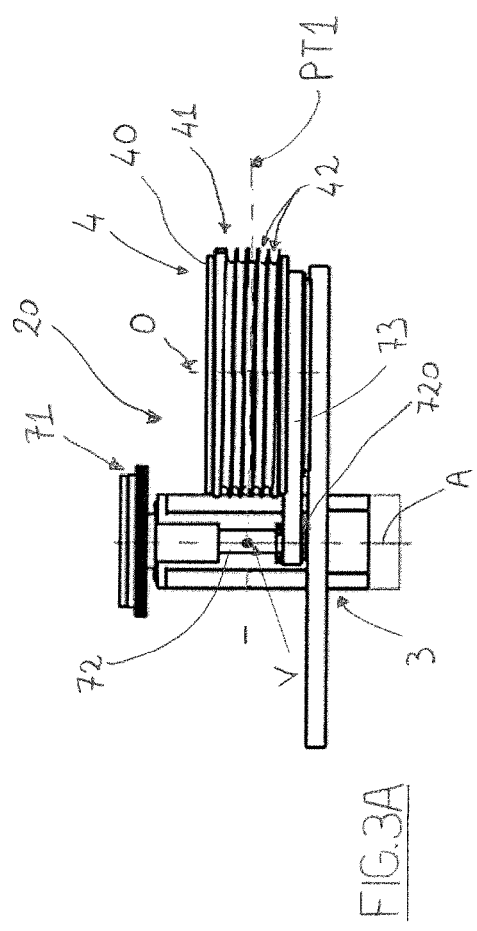
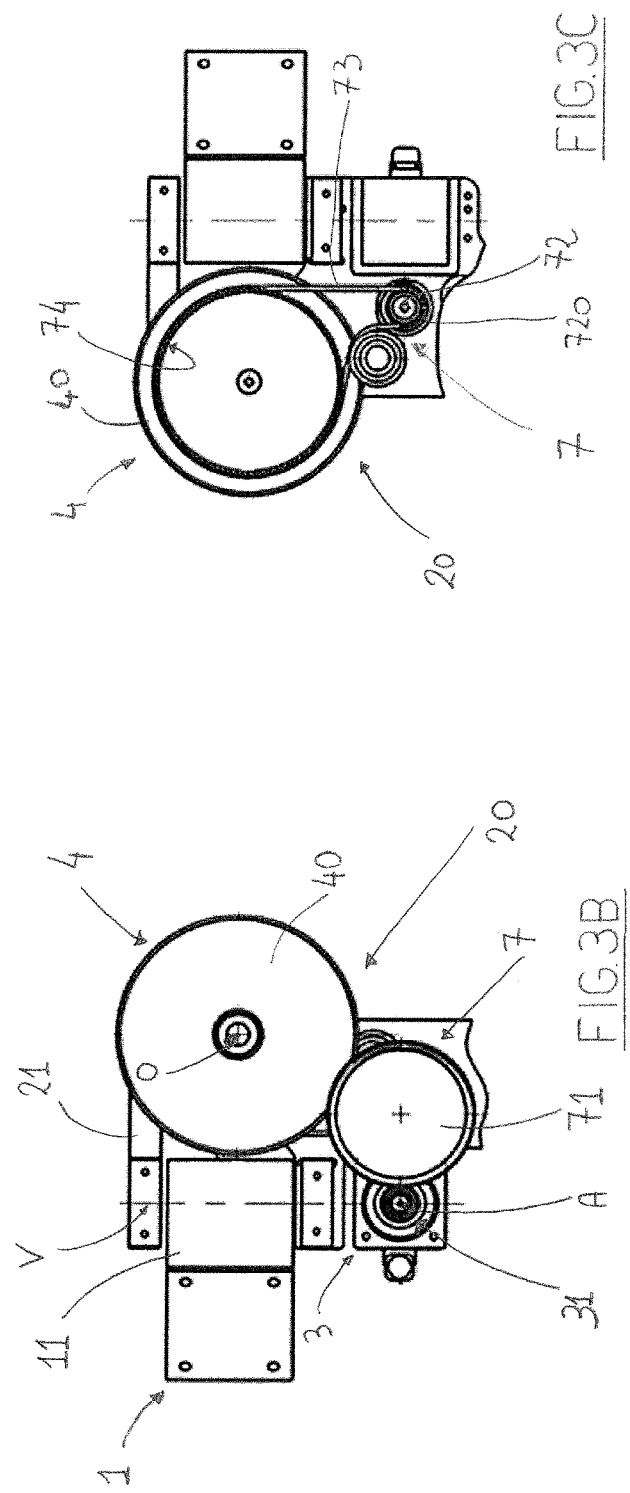

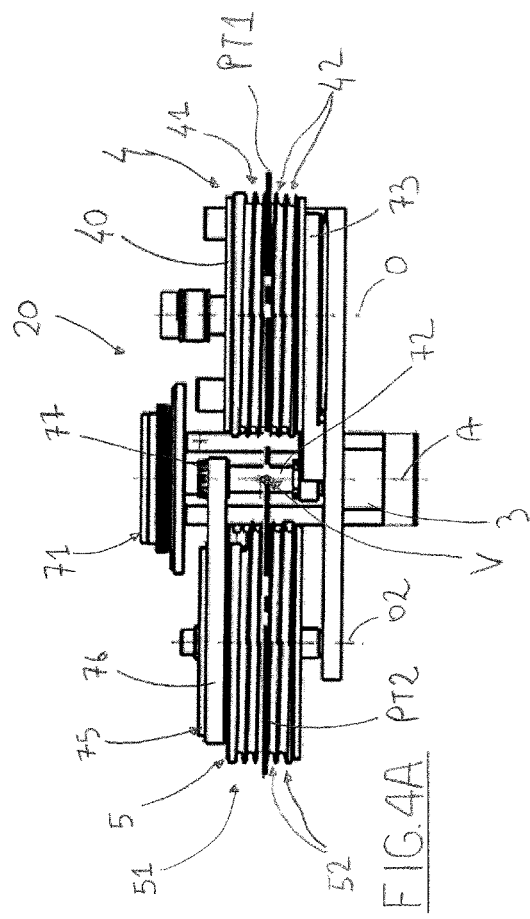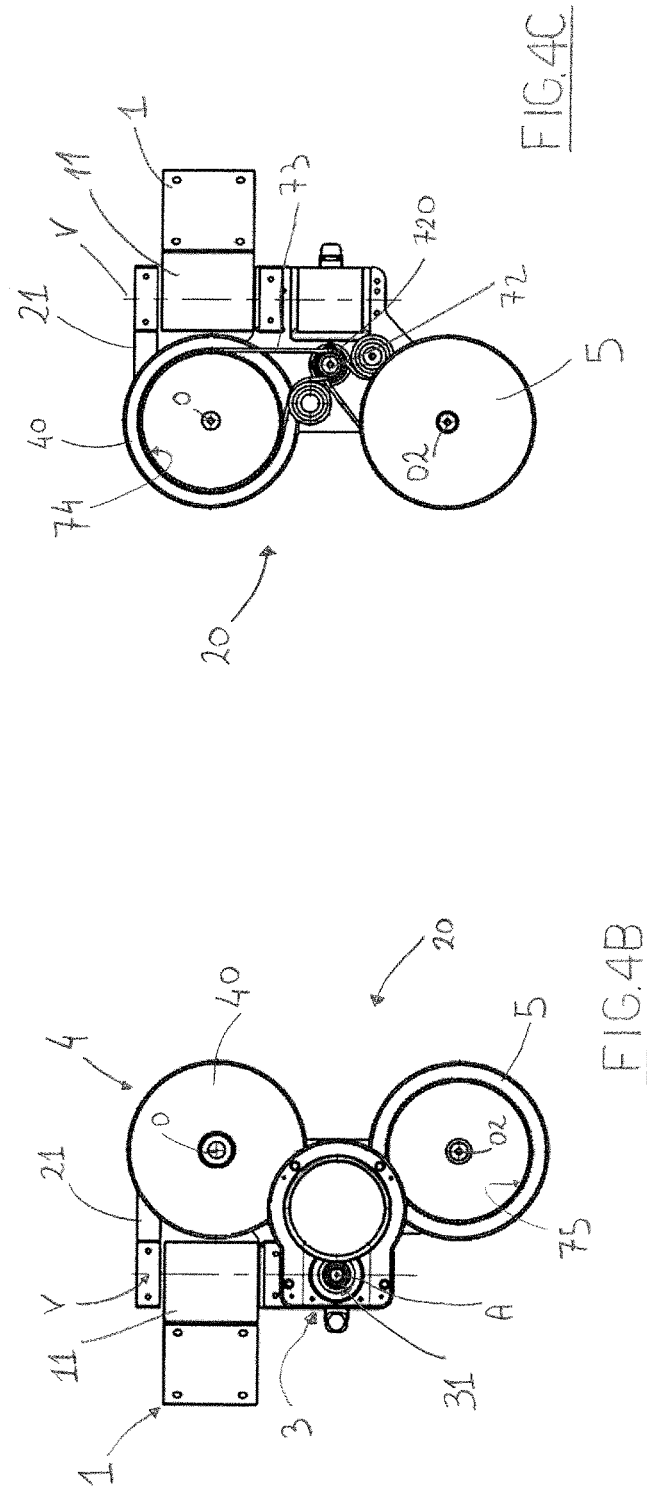

CABLE-DRIVEN ROBOT

FIELD OF THE INVENTION

The present invention relates to the technical sector concerning parallel robots, in particular cable-driven robots.

DESCRIPTION OF THE PRIOR ART

Cable-driven robots use cables to maintain an element or device in suspension and to move the element or device internally of a three-dimensional space.

FIG. 1A schematically illustrates the classic structure of a cable-driven robot.

Cable-driven robots comprise a base structure (F), or frame, which is fixed, a movable element (EM) which is maintained suspended by a series of cables (C) and which must be moved in a three-dimensional space with respect to the fixed base structure (F) by movement of the cables, following a lengthening or shortening thereof.

The movable element (E) can, for example, comprise a tool, or a platform on which an operating organ is mounted that is predisposed to perform determined operations, such as, for example, picking up and releasing of objects, or other types of operations or processes.

Cable-driven robots comprise, in this regard, a movement system for moving cables, i.e. for lengthening and shortening them.

The movement system (S) of the cables comprises a plurality of movement units (G) (for example six as illustrated in FIG. 1A)) which are mounted on the base structure (F) and which are responsible for the movement of the cables, and therefore for the movement of the movable element (E).

In the prior-art cable-driven robots, each movement unit (G) (see for example FIGS. 1B, 1C and 1D which illustrate various embodiments of movement units used in the prior art) comprises a motor (M), which is rigidly fixed and constrained to the base structure (F), and provided with a rotation shaft, and a drum (T), directed directly or by means of a mechanism, to the rotation shaft of the motor (M), and drivable in rotation by the motor (M), on which a relative cable is wound/unwound.

Each cable (C) therefore comprises a first end, that is fixed to the movable element (E) and a second end that is instead fixed to a relative drum (T) of a movement unit (G).

The motor (M) of each movement unit (G) is predisposed to activate the drum (T) in rotation in two opposite rotation directions, and this determines the winding or unwinding of the cable on the drum, and thus the shortening or lengthening thereof.

In this way, each cable connected to the movable operating element can be shortened (pulled) or lengthened (released) and thus the length thereof (extension) between the fixing point to the movable element and the relative drum can be varied, either by reducing or increasing.

Therefore, by appropriately activating the various motors, i.e. by activating in rotation the relative drums, and thus lengthening or shortening the various cables, it is possible to move and displace the movable element with respect to the base structure, and vary the position thereof in a three-dimensional work space.

In the prior-art cable-driven robots, the drums (T) on which the cables wind/unwind usually comprise a smooth cylindrical lateral surface.

As previously mentioned, FIGS. 1B, 1C, and 1D illustrate examples of movement units (G) of the cables present in the cable-driven robots of the prior art.

These figures show the motors (M) which are fixed to the base structure (F) and the drums (T) on which the cables (C) wind/unwind following the activation in rotation of the drum (T) in one direction or another.

Each cable (C), as is clearly visible in these figures, comprises a winding portion (CP) on the drum (T) formed by a series of turns wound on the drum (T), having a same diameter and being mutually contiguous.

The winding portion (CP) therefore forms a helical winding about the drum, with the winding turns contiguous to one another and in reciprocal contact.

The movement system (S) further comprises, for each movement unit (G), cable guide elements (R) or return elements (R) of the cable (C), such as for example eyelets or pulleys or the like, which are predisposed to guide, switch and orientate the cable (C) with respect to the drum (T) on the basis of the actual position that the movable element (E) assumes in space.

A cable-driven robot of the prior art as previously described is for example described in document FR2910833.

This type of cable-driven robot, however, presents some drawbacks.

Firstly, as the cables wind with a helical winding on the drum with a winding portion which comprises a series of turns contiguous to one another and reciprocally in contact, during the unwinding/winding of the cables there can occur reciprocal dragging between the turns, with a consequent increase in wear on the cable.

Further, the cables are subjected to non-insignificant torque and/or flexion stresses when they are switched, by means of the guide or return elements, during the movement of the movable element in space with respect to the drums, as the drums are fixed, since they are fixed to the motors rigidly connected and fixed to the fixed base structure.

SUMMARY OF THE INVENTION

An aim of the present invention is therefore to describe a novel cable-driven robot able to obviate the above-mentioned drawbacks of the prior art as described in the foregoing.

In particular, the aim of the present invention is to describe a novel cable-driven robot able to conserve the intactness of the cables, or at least to drastically reduce the onset of wear and, at the same time, guarantee excellent movement of the movable element in a three-dimensional space.

A further object of the present invention is therefore to describe a novel cable-driven robot which enables realising a movement of the cables, as a function of the position into which the movable operating element is to be brought and positioned, in a rapid and precise way, without creating sudden stresses on the cables in the case of sharp rotations of the cables with respect to the base structure.

The above aims are attained according to a cable-driven robot according to the claims.

BRIEF DESCRIPTION OF THE DRAWINGS

The characteristics of preferred, but not exclusive, embodiments of the cable-driven robot described with the present invention will be set out in the following description with reference to the accompanying tables of drawings, in which:

FIG. 3A schematically illustrates in a plan view, some significant components of the cable-driven robot object of the present invention, according to a preferred embodiment;

FIG. 3B illustrates, in a first lateral view, the components of FIG. 3A;

FIG. 3C illustrates the components of FIG. 3A in a second lateral view, opposite the first lateral view;

FIG. 4A illustrates, schematically and in a plan view, some significant components of the cable-driven robot object of the present invention, according to another possible preferred embodiment;

FIG. 4B illustrates, in a first lateral view, the components of FIG. 4A;

FIG. 4C illustrates the components of FIG. 4A in a second lateral view, opposite the first lateral view.

DESCRIPTION OF THE PREFERRED EMBODIMENTS

Figure 1A:
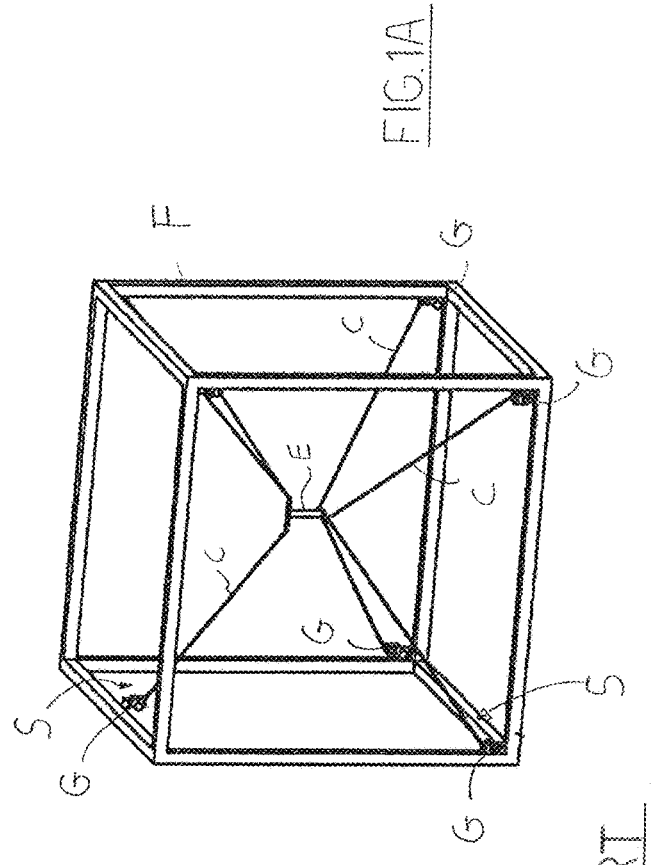
FIG. 1A already mentioned in the foregoing, illustrates a cable-driven robot of the prior art, while FIGS. 1B, 1C and 1D, also mentioned in the foregoing, illustrate examples of embodiments of the movement units of the cables present in the cable-driven robots of the prior art.
Figure 1D:
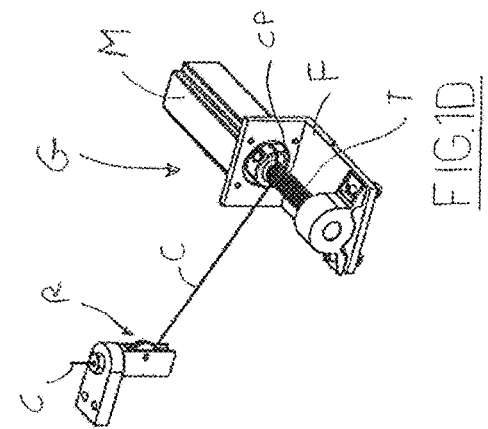
Figure 1C:
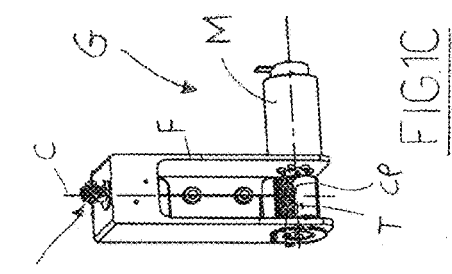
Figure 1B:
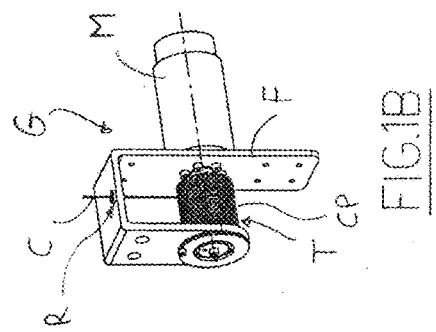

With reference to the appended tables of drawings, in particular FIG. 2, and FIGS. 3A-3C, 4A-4C, reference numeral (100) denotes the cable-driven robot of the present invention, in its entirety.

The cable-driven robot (100) comprises a base structure (1), a plurality of cables (C) and a movable element (EM) which is maintained suspended by means of the plurality of cables (C).

Figure 2:
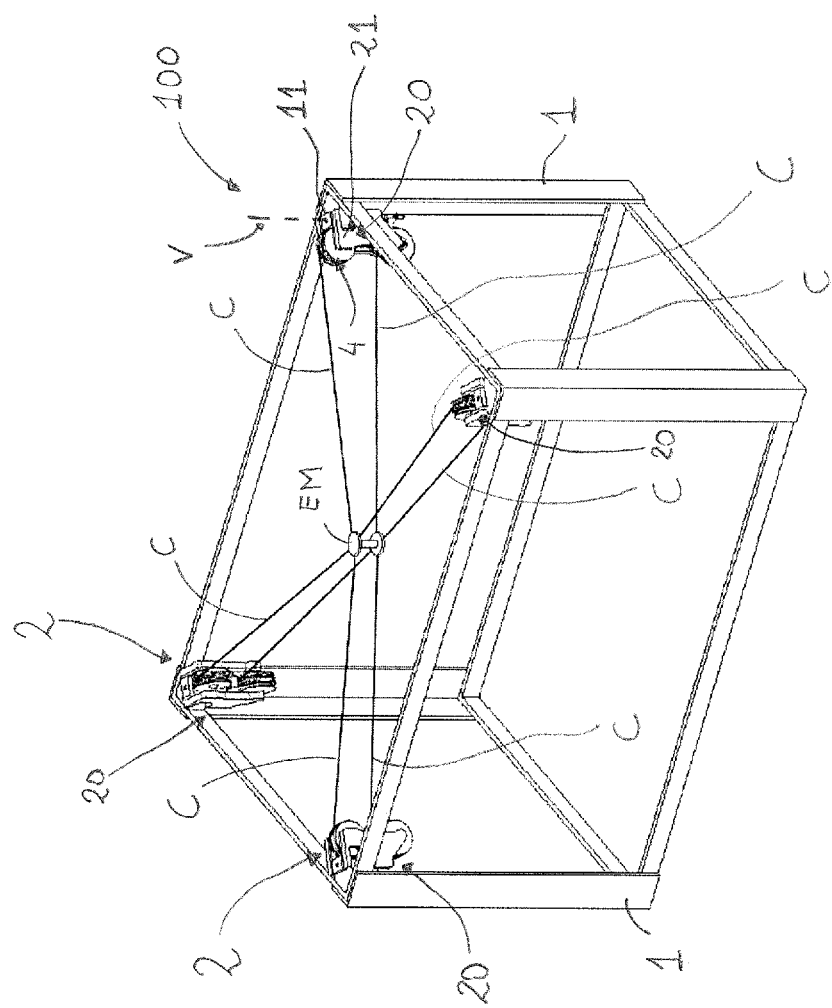
FIG. 2 illustrates, in a schematic perspective view, the cable-driven robot object of the present invention.

In this regard, each cable (C) of the plurality of cables (C) comprises a first end fixed to the movable operating element (EM) (see FIG. 2).

The cable-driven robot (100) further comprises a movement system (2) for moving the cables (C), and thus for moving the movable operating element (EM) in space with respect to the base structure (1).

The movement system (2) comprises a plurality of movement units (20) of the cables (C).

The peculiarities of the cable-driven robot (100) described in the present invention consist in the fact that the at least a movement unit (20) of the plurality of movement units (20) is realised in the following way.

The at least a movement unit (20), and preferably all the movement units (20) of the plurality of movement units (20), comprises a frame (21) which is hinged to a part (11) of the base structure (1) pivotingly about a vertical hinge axis (V) so that the frame (21) can rotate about the vertical hinge axis (V) with respect to the base structure (1).

The movement unit (20) further comprises (see for example FIGS. 3B and 3C):
- a motor (3), directly mounted on the frame (21), and comprising a rotation shaft (31);
- the at least a winding/unwinding element (4) of a cable (C) has a fixing point at which a second end of a cable (C) of the plurality of cables (C) is fixed, the winding/unwinding element (4) comprises a drum (40) mounted directly on the frame (21) in such a way as to be connected to the rotation shaft (31) of the motor (3) and to be drivable in rotation following the activation in rotation, in one direction or the other, of the rotation shaft (31) by the motor (3).

In greater detail (as illustrated in FIG. 3A) the drum (40) comprises a lateral surface (41) which is conformed in such a way as to comprise a helical groove (42) which extends coaxially with respect to the axis of the drum (40) and defining a series of hollow turns each of which is conformed to receive and contain internally thereof a corresponding winding turn of the cable (C) during the winding/unwinding of the cable (C) about the drum (40).

In particular, the helical groove (42) is realised in such a way as to have a depth and width that are such that each turn of the series of hollow turns defined thereby can accommodate and receive internally thereof only one corresponding winding turn of the hollow (C).

In this way, each winding turn of the cable about the drum will be kept separate and distinct from the spire that precedes it and from the turn that follows it.

In substance, in other words, each turn of the helical groove will have a bottom wall and two lateral walls (or abutments) between which one only and a corresponding winding turn (C) of the cable (C) will be accommodated.

Thus, therefore, owing to this particular conformation of the drum about which the cable is wound or unwound during the movement movable operating element, each winding turn of the cable about the drum will be kept separate and distinct from the turns that precede and follow it, consequently preventing any reciprocal dragging between them which might jeopardise the intactness thereof and be the cause of rapid wear.

Further, as both the motor for activation in rotation of the drum, and the drum itself about which the cable winds/unwinds, are mounted on the frame which is pivoting with respect to the base structure, i.e. is rotatable about a vertical hinge axis with respect to a part of the base structure, during the movement of the movable element in space, the cable is not subject to deviations or twisting.

This is because the drum, when rotating with the frame with respect to the base structure, will automatically adjust the orientation and position thereof to the position which time by time the movable element will assume, so that in practice there is an auto-alignment of the drum to the actual position assumed by the movable element.

In substance, the portion of cable comprised between the movable element and the drum, i.e. the portion comprised between the anchoring point to the movable element and the winding portion wound on the drum, will always be substantially perpendicular to the rotation axis of the drum.

In this way the onset of stresses either in flexion or torque of the cable will be prevented, which, over time, might be the cause of wear and deterioration of the cable.

Further, with the aim of further reducing the onset of wear in the cable, the lateral surface of the drum on which the helical groove is made can be realised in special materials with a low coefficient of friction.

Other further advantageous characteristics of the cable-driven robot of the invention are described in the following.

The motor (3) is preferably mounted on the frame (21) in such a way that the axis (A) of the rotation shaft (31) is perpendicular to the vertical hinge axis (V) of the frame (21) at the part (11) of the base structure (1) and in such a way that the axis (A) of the rotation shaft (31) is aligned to the vertical hinge axis (V) of the frame (21) and lies on a plane that is vertical and perpendicular to the part (11) of the base structure (1) to which the frame (21) is hinged.

This facilitates the sensitivity and reactivity of the frame, and therefore of the motor mounted thereon, in autonomously and automatically aligning with the positions which the movable element will assume from time to time.

For this purpose the drum (40) is further mounted on the frame (21) in such a way as to be drivable in rotation about a horizontal rotation axis (O) which lies on a vertical plane parallel to the vertical hinge axis (V) of the frame (1) and parallel to the axis (A) of the rotation shaft (31).

A further preferred and advantageous aspect relates to the fact that the drum (40) is mounted on the frame (21), and the helical groove (42) is realised on the lateral surface of the drum (40) in such a way that a transversal median plane (PT1) which transversally crosses the drum (40) is a median plane also with respect to the helical groove (42) and identifies a vertical plane which is aligned and contains the vertical hinge axis (V) of the frame (21) at the part (11) of the base structure (1) which is perpendicular to the axis of the rotation shaft (31) of the motor (3) (see in particular FIG. 3A).

In this way, during the winding or unwinding of the cable from and onto the drum, the winding turns of the cable will rest only on one of the two walls (or abutments) of the helical groove, in other words the single turn of the cable during the winding will be able to rest on a first wall (or abutment) of the relative turn in which the turn of the cable winds, and during the unwinding of the cable from the drum the turn will unwind resting instead on the second wall (or abutment) of the relative turn of the helical groove.

This will further reduce the risk and possibility of wear on the cable.

According to the preferred, and not exclusive, embodiment illustrated in figures from 3A to 3C, the drum (40) is connected to the rotation shaft (31) of the motor (3) by means of a drive transmission system (7) which is made in such a way as to comprise: a cogwheel (71), mounted on the frame (21) and coupled and drivable in rotation by the rotation shaft (31) of the motor (3), a secondary shaft (72) which is borne by the cogwheel (71) and which comprises a cogged portion (720), and a cogged belt (73) which winds on the cogged portion (720) of the secondary shaft (72) and on a crown wheel (74) mounted at an end of the drum (40).

According to a possible other preferred embodiment, illustrated in figures from 4A to 4C, the at least a movement unit (20) can also comprise a second drum (5) which is mounted on the frame (21) in such a way as to be connected to the rotation shaft (31) of the motor (3) and to be drivable in rotation following the activation in rotation, in one rotation direction or the other, of the rotation shaft (31) by the motor (3).

The second drum (5) comprises a second fixing point for fixing an end of a second cable (C) of the plurality of cables (C) and comprises a lateral surface (51) which is conformed in such a way as to comprise a second helical groove (52) which extends coaxially with respect to the axis of the second drum (5) and which defines a series of hollow turns each of which is conformed to receive and contain internally thereof a corresponding winding turn of a second cable (C) during the winding/unwinding of the second cable (C) about the second drum (5).

In this way, and advantageously, with a single motor it is possible to command the movements of two cables.

In order also to obtain, for the second cable, the same effects and advantages as in the embodiment with a single drum, the second drum (5) will be mounted on the frame (21) in the following way (as also illustrated in detail in FIG. 4A).

The second drum (5) is mounted on the frame (21) so that the relative rotation axis (O2) is horizontal and parallel to the rotation axis (O) of the drum (40) and parallel to the vertical hinge axis (V) of the frame (21) at the part (11) of the base structure (1).

More in particular, the second drum (5) is mounted on the frame (21) in such a way that a transversal median plane (PT2) which transversally crosses the second drum (5) is a median plane also with respect to the second helical groove (52) and identifies a vertical plane which is aligned to and contains the vertical hinge axis (V) of the frame (21) at the part (11) of the base structure (1) which is perpendicular to the axis of the rotation shaft (31) of the motor (3) and coincides with the transversal median plane (PT1) of the drum (40).

For the activation in rotation of the second drum (5), contemporaneously with the activation in rotation of the drum (40), a second crown wheel (75) is included, which is mounted on an end of the second drum (5), and a second cogged belt (76) which winds on the second crown wheel (75) and on a cogged hub (77) mounted on the secondary shaft (72) of the drive transmission system (7).

The invention claimed is:

1. A cable-driven robot comprising:
   a base structure;
   a plurality of cables;
   a movable operating element which is maintained suspended by the plurality of cables, wherein each cable of the plurality of cables comprises a first end fixed to the movable operating element;
   a movement system for moving the cables, and thus for moving the movable operating element in space with respect to the base structure, the movement system comprising a plurality of movement units of the cables;
   wherein at least one movement unit of the plurality of movement units comprises:
   a frame, which is hinged to a part of the base structure pivotingly about a vertical hinge axis so that the frame can rotate about the vertical hinge axis with respect to the base structure;
   a motor, mounted on the frame, and comprising a rotation shaft;
   at least a winding/unwinding element of one cable of the plurality of cables having a fixing point at which a second end of the one of the plurality of cables is fixed, the winding/unwinding element comprising a drum, which is mounted on the frame in such a way as to be connected to the rotation shaft of the motor and to be drivable in rotation following the activation in rotation, in one rotation direction or another, of the rotation shaft by the motor, the drum comprising a lateral surface which is conformed in such a way as to comprise a helical groove which extends coaxially with respect to an axis of the drum and defining a series of hollow turns each of which is conformed to receive and contain internally thereof a corresponding winding turn of the cable during the winding/unwinding of the cable about the drum,
   wherein the drum is connected to the rotation shaft of the motor by a drive transmission system comprising a cogwheel, mounted on the frame and coupled and drivable in rotation by the rotation shaft of the motor, a secondary shaft which is borne by the cogwheel and which comprises a cogged portion, and a cogged belt which winds on the cogged portion of the secondary shaft and on a crown wheel mounted at an end of the drum.

2. The cable-driven robot of claim 1, wherein the motor is mounted on the frame in such a way that an axis of the rotation shaft is perpendicular to the vertical hinge axis of the frame at the part of the base structure and in such a way that the axis of the rotation shaft is aligned to the vertical hinge axis of the frame and lies on a plane that is vertical and perpendicular to the part of the base structure to which the frame is hinged.

3. The cable-driven robot of claim 1, wherein the drum is mounted on the frame in such a way as to be drivable in rotation about a horizontal rotation axis which lies on a vertical plane parallel to the vertical hinge axis of the frame and parallel to the axis of the rotation shaft.

4. The cable-driven robot of claim 3, wherein the drum is mounted on the frame, and wherein the helical groove is realized on the lateral surface of the drum in such a way that a transversal median plane which transversally crosses the drum is a median plane also with respect to the helical groove and identifies a vertical plane which is aligned and contains the vertical hinge axis of the frame at the part of the base structure which is perpendicular to the axis of the rotation shaft of the motor.

5. The cable-driven robot of claim 1, wherein the at least one movement unit comprises a second drum, mounted on the frame in such a way as to be connected to the rotation shaft of the motor and to be drivable in rotation following the activation in rotation, in the one rotation direction or the other, of the rotation shaft by the motor, the second drum having a second fixing point for fixing an end of a second cable of the plurality of cables and comprising a lateral surface which is conformed in such a way as to comprise a second helical groove which extends coaxially with respect to an axis of the second drum and defining a series of hollow turns each of which is conformed to receive and contain internally thereof a corresponding winding turn of the second cable during the winding/unwinding of the second cable about the second drum.

6. The cable-driven robot of claim 5, wherein the second drum is mounted on the frame so that a relative rotation axis is horizontal and parallel to the rotation axis of the drum and parallel to the vertical hinge axis of the frame at the part of the base structure.

7. The cable-driven robot of claim 6, wherein the second drum is mounted on the frame in such a way that a transversal median plane which transversally crosses the second drum is a median plane also with respect to the second helical groove and identifies a vertical plane which is aligned to and contains the vertical hinge axis of the frame at the part of the base structure which is perpendicular to the axis of the rotation shaft of the motor and coincides with the transversal median plane of the second drum.

8. A cable-driven robot comprising:
a base structure;
a plurality of cables;
a movable operating element which is maintained suspended by the plurality of cables, wherein each cable of the plurality of cables comprises a first end fixed to the movable operating element;
a movement system for moving the cables, and thus for moving the movable operating element in space with respect to the base structure, the movement system comprising a plurality of movement units of the cables;
wherein at least one movement unit of the plurality of movement units comprises:
a frame, which is hinged to a part of the base structure pivotingly about a vertical hinge axis so that the frame can rotate about the vertical hinge axis with respect to the base structure;
a motor, mounted on the frame, and comprising a rotation shaft;
at least a winding/unwinding element of one cable of the plurality of cables having a fixing point at which a second end of the one of the plurality of cables is fixed, the winding/unwinding element comprising a drum, which is mounted on the frame in such a way as to be connected to the rotation shaft of the motor and to be drivable in rotation following the activation in rotation, in one rotation direction or another, of the rotation shaft by the motor, the drum comprising a lateral surface which is conformed in such a way as to comprise a helical groove which extends coaxially with respect to an axis of the drum and defining a series of hollow turns each of which is conformed to receive and contain internally thereof a corresponding winding turn of the cable during the winding/unwinding of the cable about the drum,
wherein the drum is connected to the rotation shaft of the motor by a drive transmission system comprising a cogwheel, mounted on the frame and coupled and drivable in rotation by the rotation shaft of the motor, a secondary shaft which is borne by the cogwheel and which comprises a cogged portion, and a cogged belt which winds on the cogged portion of the secondary shaft and on a crown wheel mounted at an end of the drum,
wherein the at least one of the movement units comprises a second drum, mounted on the frame in such a way as to be connected to the rotation shaft of the motor and to be drivable in rotation following the activation in rotation, in the one rotation direction or the other, of the rotation shaft by the motor, the second drum having a second fixing point for fixing an end of a second cable of the plurality of cables and comprising a lateral surface which is conformed in such a way as to comprise a second helical groove which extends coaxially with respect to an axis of the second drum and defining a series of hollow turns each of which is conformed to receive and contain internally thereof a corresponding winding turn of the second cable during the winding/unwinding of the second cable about the second drum, further comprising a second crown wheel mounted on an end of the second drum and a second cogged belt which winds on the second crown wheel and on a cogged hub mounted on a secondary shaft of the drive transmission system.

9. The cable-driven robot of claim 8, wherein the motor is mounted on the frame in such a way that an axis of the rotation shaft is perpendicular to the vertical hinge axis of the frame at the part of the base structure and in such a way that the axis of the rotation shaft is aligned to the vertical hinge axis of the frame and lies on a plane that is vertical and perpendicular to the part of the base structure to which the frame is hinged.

10. The cable-driven robot of claim 8, wherein the drum is mounted on the frame in such a way as to be drivable in rotation about a horizontal rotation axis which lies on a vertical plane parallel to the vertical hinge axis of the frame and parallel to the axis of the rotation shaft.

11. The cable-driven robot of claim 10, wherein the drum is mounted on the frame, and wherein the helical groove is realized on the lateral surface of the drum in such a way that a transversal median plane which transversally crosses the drum is a median plane also with respect to the helical groove and identifies a vertical plane which is aligned and contains the vertical hinge axis of the frame at the part of the base structure which is perpendicular to the axis of the rotation shaft of the motor.

12. The cable-driven robot of claim 8, wherein the second drum is mounted on the frame so that a relative rotation axis is horizontal and parallel to the rotation axis of the drum and parallel to the vertical hinge axis of the frame at the part of the base structure.

13. The cable-driven robot of claim 12, wherein the second drum is mounted on the frame in such a way that a transversal median plane which transversally crosses the second drum is a median plane also with respect to the second helical groove and identifies a vertical plane which is aligned to and contains the vertical hinge axis of the frame at the part of the base structure which is perpendicular to the axis of the rotation shaft of the motor and coincides with the transversal median plane of the second drum.

* * * * *